United States Patent

Rogers et al.

[15] 3,654,008

[45] Apr. 4, 1972

[54] MANUFACTURE OF A PROCESS OF A PLASTIC T-ASSEMBLY

[72] Inventors: Frank J. Rogers, Waka; Joe MacClose, Spearman, both of Tex.

[73] Assignee: Rogers Sales & Service, Inc., Waka, Tex.

[22] Filed: July 15, 1970

[21] Appl. No.: 55,113

Related U.S. Application Data

[63] Continuation-in-part of Ser. No. 831,814, May 22, 1969.

[52] U.S. Cl............................156/152, 156/196, 156/214, 156/242, 156/293, 156/308, 285/156
[51] Int. Cl.........................................................B32b 31/14
[58] Field of Search................156/152, 165, 229, 242, 252, 156/256, 293, 296, 303.1, 307, 308, 322, 214, 294, 311

[56] References Cited

UNITED STATES PATENTS

| | | | |
|---|---|---|---|
| 3,035,958 | 5/1962 | Wilkins | 156/322 X |
| 3,117,903 | 1/1964 | Hix | 156/308 X |
| 3,528,865 | 9/1970 | Amberg et al. | 156/229 X |
| 3,406,055 | 10/1968 | Rubel | 156/309 X |
| 3,183,023 | 5/1965 | Morrison | 285/186 |

*Primary Examiner*—Reuben Epstein
*Attorney*—Ely Silverman

[57] ABSTRACT

Process of manufacture of a plastic T-assembly comprising a conduit with sput unit in combination with a shaped stem unit, wherein the conduit and sput unit is used as a mold and a part of the stem is utilized as a positioning device for forming a closely mating saddle surface portion on the stem unit between and joining the stem unit and the conduit and sput unit.

6 Claims, 16 Drawing Figures

Patented April 4, 1972
3,654,008
3 Sheets-Sheet 1
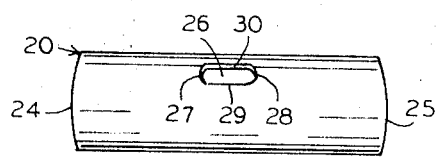
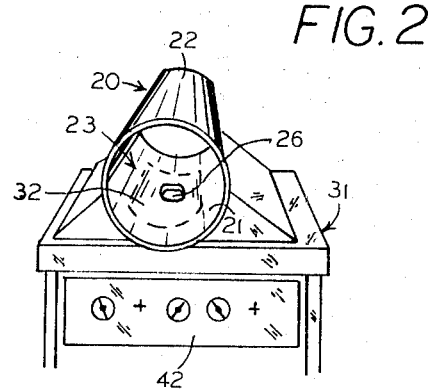
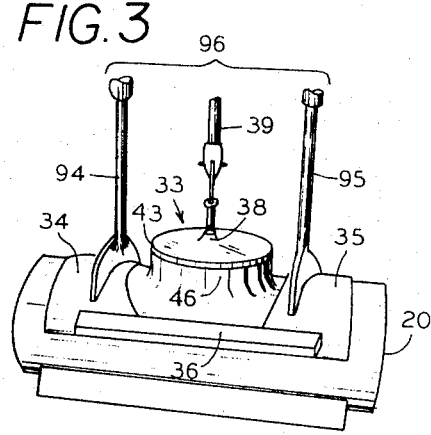
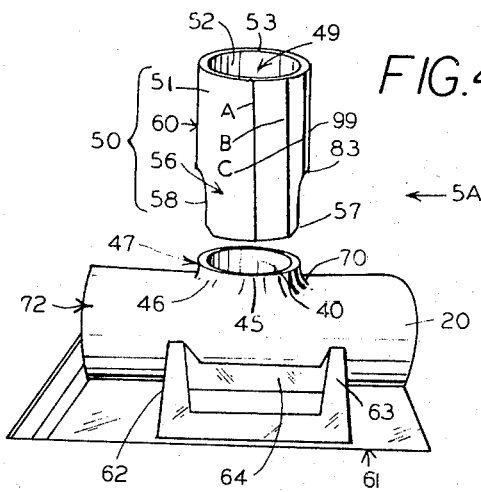
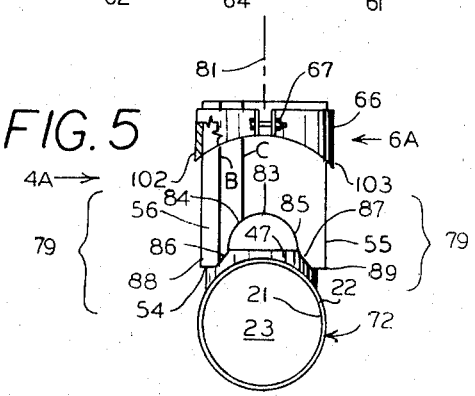
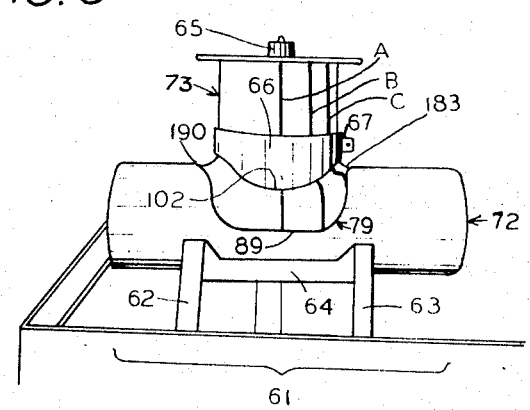
INVENTORS
FRANK J. ROGERS
AND JOE MAC CLOSE
BY
Ely Silverman
ATTORNEY

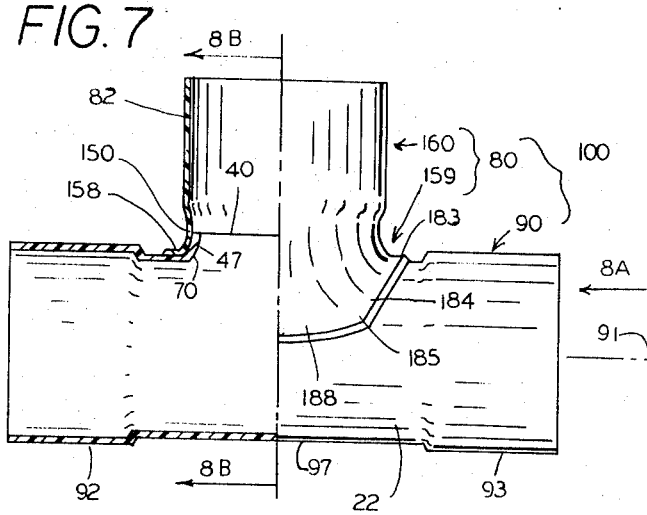
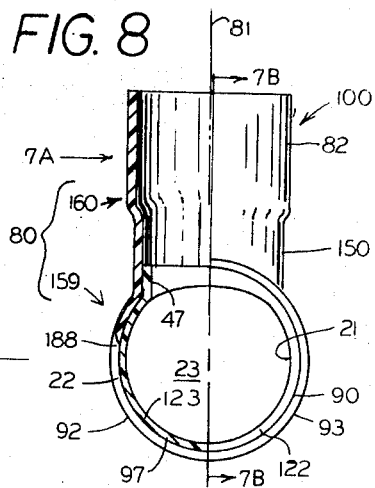
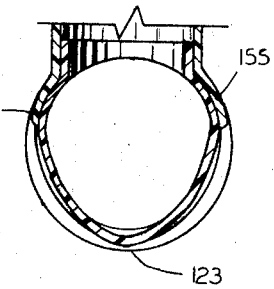
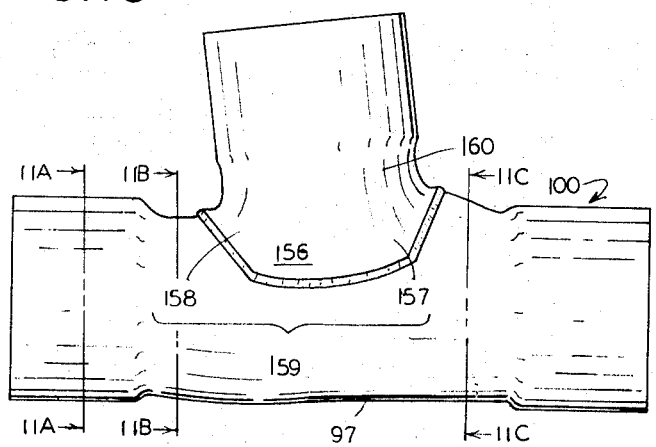
INVENTORS
FRANK J. ROGERS
AND JOE MAC CLOSE
BY Ely Silverman
ATTORNEY Patented April 4, 1972

FRANK J. ROGERS
AND JOE MAC CLOSE
INVENTORS

BY

Ely Silverman
ATTORNEY 3,654,008

MANUFACTURE OF A PROCESS OF A PLASTIC T-ASSEMBLY

CROSS-REFERENCE TO RELATED APPLICATIONS

This application is a continuation-in-part of our co-pending application Ser. No. 831,814 filed May 22, 1969.

BACKGROUND OF THE INVENTION:

1. Field of the Invention

Plastic article shaping and treating by mechanical, thermal and chemical means.

2. Description of the Prior Art

The prior art has not provided a feasible and reliable process for manufacturing branched plastic pipe joint connectors for use with plastic irrigation pipe. This invention provides a reliable process of manufacture for forming plastic tees and crosses that utilizes the flexibility and strength of the pipe in a manner not heretofore utilized.

SUMMARY OF THE INVENTION

To form a close fit of a plastic conduit and a saddle therefor, a sput with a smoothly curved transition zone is formed on the conduit to join with and locate a saddle and the saddle is stretched and quenched in contact with a portion of the conduit and sput to form an extremely close fit. This structure allows flexing of the conduit wall not fixed to and stiffened by the saddle and mechanically locates the saddle as well as providing cement attachment.

BRIEF DESCRIPTION OF THE DRAWINGS

FIGS. 1-6 show stages in the sequence of formation of the T-assembly 100.

FIG. 1 is a side and top oblique view of the pipe element 20 used to form conduit portion 90;

FIG. 2 is a subsequent stage in the formation of the conduit portion 90;

FIG. 3 shows the step of the process subsequent to that shown in FIG. 2 in forming the conduit portion 90 of the T-assembly.

FIG. 4 is a side view of stem unit 50 and shaped conduit unit 72 in a first stage of their joining taken along direction of arrow 4A in FIG. 5.

FIG. 5 is a frontal view along the direction of the arrow 5A of FIG. 4.

FIG. 6 is a side view in direction of arrow 6A of FIG. 5 showing a stage in the formation in the T-assembly 100 subsequent to that shown in FIG. 5.

The lines A, B and C of FIGS. 4 and 5 are parallel vertical lines drawn on the outer wall of stem unit 50; FIG. 6 shows their disposition after forming and stretching as herebelow described.

FIG. 7 is, in part, a side view along direction of arrow 7A of FIG. 8 and, in part, a vertical longitudinal sectional view of the T-assembly 100 along section 7B—7B.

FIG. 8 is, in part, an end view of the T-assembly 100 taken along the direction of the arrow 8A of FIG. 7 and, in part, a sectional view along section 8B—8B of FIG. 7.

FIG. 9 is a sectional view of the T-assembly 100 taken along the section 8B—8B of FIG. 7 in a strained condition.

FIG. 10 is a diagrammatic side view of the T-assembly 100 as shown in FIG. 7 and exaggerated to show certain geometrical relationships of components of the T-assembly 100 during one of its stressed conditions.

FIGS. 11A, 11B, and 11C are, respectively, transverse cross sectional views along the sections indicated as 10A—10A, 10B—10B, and 10C—10C of FIG. 11.

DESCRIPTION OF THE PREFERRED EMBODIMENTS

Figure 12:
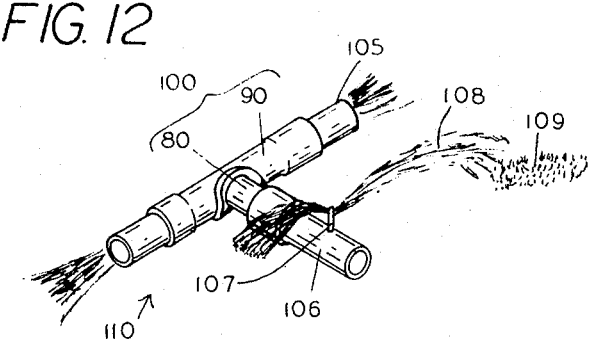
FIG. 12 is a diagrammatic representation of an irrigation system of which T-assembly 100 is a connector part.

The T-shaped assembly 100 (shown in FIG. 7) which is a product of this invention comprises a conduit portion 90 and a stem portion 80 operatively joined. The characteristics of these components and method by which these components are formed and brought together are designed to improve the utility of the completed structure.

In the manufacture of T-assembly 100 a cylindrical plastic pipe element 20 (shown in FIG. 1) of high flexural strength having an inner wall surface 21 and an outer wall surface 22 (shown in FIG. 2) outlining a cylindrical chamber 23 is cut to provide a hole 26 therein which hole is elongated in direction of the axis of the pipe element 20. The particular pipe shown is a P.V.C. polyvinyl chloride Type 1 grade 1 (by ASTM Spec. No. 1784) with a 10 ¼ inch o.d. and a ¼ inch wall thickness. The particular length from the left end 24 of the pipe element 20 to the right end 25 is not critical but is usually, for a 10 inch diameter pipe 20, about 3 feet. The distance (5 inches) across the left edge 27 to the right edge 28 of the hole is greater than the length (2 inches) from the front edge 29 to the rear edge 30 of hole 26. A portion of the pipe element 20 in zone 32 with such hole 26 therein is then heated to a temperature substantially in excess of the distortion temperature (at 66° F.), approximately 250° F. in this particular embodiment of process, as shown in FIG. 2, in the zone 32 while such pipe element is supported in a jig 31. The temperature in such zone 32 is closely controlled, as by thermal controls as 42 on the jig 31, and the heating brings the entire wall thickness over that area of the pipe element which the subsequent drawing is intended to affect to a uniform temperature, the heated area is as large as and substantially the same as the wall surface area encompassed between the drawing seat elements 34, 35, 36 (as shown in FIG. 3) and 37 (not shown). Following such heating and while the thus heated portion of the pipe wall is above its distortion temperature a. the pipe element 20 is supported in a jig longitudinally extending parallel to the axis of pipe element 20 with elongated hole 20 facing upwards and b. concave seating elements 34 and 35 that conform, i.e. have the same inner diameter as the outer diameter of the outer wall surface 22 of pipe element 20 are placed by vertically extending arms 94 and 95 of an assembly 96 to which such arms and drawbar 39 are attached against the upper outer wall surface 22 of the pipe element 20 on either side of and equispaced from the elongated hole 26 as shown in FIG. 3 and c. a relatively flat, extremely rigid circular metal mandrel 33 with a smooth rounded edge 43 and an eyebolt 38 located in the geometrical center of the top surface thereof is placed into the chamber 23 and the eyebolt 38 on the mandrel is connected to a drawbar 39 through elongated hole 26, and d. rigid longitudinally extending connecting elements as 36 (and a rear element 37) are firmly attached to and with arms 94 and 95, hold the seating elements 34 and 35 in fixed relationship across the periphery of the circular hole 40 formed while drawing the mandrel 33 slowly and evenly through the elongated hole 26.

The axis of the drawbar 39 is vertical and intersects the longitudinal axis of the pipe element 20 while the top surface of the mandrel is horizontal.

The top to bottom thickness of the mandrel is sufficiently substantial and its edge smoothly curved to provide for a smooth displacement of the heated plastic in zone 32. The curvature of such edge is set out in Table II herebelow and the outer diameter of the mandrel is that of the intended internal diameter of the stem unit 80 (shown in FIG. 7) desired to be attached to the pipe element 20 and the sput 47 (shown in FIG. 4) less the thickness of the walls of the sput 47.

The diameter of the mandrel may be as large as the internal diameter of the pipe element 20 although usually a diameter of the mandrel is chosen to be smaller than the diameter of the pipe element 20. Following drawing of the mandrel through the elongated hole 26 and formation of the circular hole 40 and neck zone 46 the pipe element 20 with the mandrel 33 still therein is placed into a cooling vat of cool (50°–60° F.) water and in this vat the entire structure of mandrel plus pipe element 20 is uniformly yet rapidly cooled below its distortion temperature and thus formed into rigid stable structure at room temperature (70° F.). The particular size of elongated hole 26 used provides that the edge 45 of the sput 47 produced by this drawing action forms a smooth circular opening 40 (shown in FIG. 4)

TABLE I

Internal Convex Curvature of Sput of Different Size Stems

| o.d. of stem | Radius of curvature |
|---|---|
| 12 inches | 1 ⅛ inches |
| 10 inches | 1 inch |
| 8 inches | ⅞ inch |
| 6 inches | ⅝ inch |
| 4 inches | ¼ inch |

TABLE II—MANDREL DIMENSIONS

| Diameter of Mandrel | | Mandrel Thickness | Radius of Curvature at Edge of Mandrel |
|---|---|---|---|
| Nominal | Actual | | |
| 8" | 7 5/8" | 3⅜" | ⅞ inch |
| 10" | 9 5/8" | 3⅞" | ⅝ inch |
| 12" | 11 5/8" | 4 7/8" | 7/16 inch |

The mandrel 33 in passing through the elongated hole 26 as above described thus forms a sput 47 with an opening 40 in shape of a circle with an exterior diameter substantially the same as the interior diameter of the stem portion 80 of T-assembly 100. Also the portion of the pipe element 20 wall then deformed is strengthened transversely to the longitudinal axis 91 (shown in FIG. 7) of the conduit portion by the stretching effected by the formation of the sput 47. Accordingly a stem portion (80) that forms a smooth and substantially perfect fit therewith in order to form a strong and complete as well as leak-proof attachment between such stem portion and the pipe portion 90, by perfectly mating surfaces, is achieved according to this invention and matching surfaces are economically and reliably provided at the interior bottom surface of the leg portion 79 (shown in FIG. 5) of the stem unit 50 so as to form a smooth match with the sput portion 47, transition portion 70 and part of wall surface 22 (shown in FIGS. 4 and 7) of the conduit portion 90 of the T-assembly 100. The height of the sput thus formed, that is, the vertical distance from the top of surface 22 of the pipe element 20 to edge 45 of the circular hole 40 as measured along the vertical axis 81 (shown in FIGS. 5 and 8) of the sput portion 47 is 2 inches. This is adequate length or height to provide positive location of the collar 66 (shown in FIGS. 5 and 6) and the unit 50 during the movement of the unit 50 as shown in FIGS. 4 and 5 downward over the sput portion 47, transition portion 70, and the wall surface 22 as well as being sufficiently high to mechanically prevent the stem portion 80, in the finished configuration of the T-assembly 100, from movement parallel to the longitudinal axis 91 (shown in FIG. 7) of the conduit portion 90. At the same time the radius of curvature in the transition zone 70 between the pipe and the sput portion is sufficiently "soft," i.e. is a sufficiently large radius of curvature, to permit a smooth motion of the leg portions 55 and 56 during the downward motion of such legs over the top and sides of the shaped conduit unit 72. Such softness or gradualness of curvature is also essential for an extremely close fit and a uniformly distributed stretching of the portion of the stem portion 80 adjacent to the exterior of the complexly shaped transition portion 70 of the shaped conduit unit 72.

The stem unit 50 which is formed into the stem portion 80 of the assembly 100, is a generally cylindrical tube with an upper body portion 60 and a bifurcated leg portion 79 (as shown in FIG. 5) so that it is, prior to its joining the shaped conduit unit 72, generally shaped like an inverted letter Y-structure.

The stem unit 50 has a circular top edge 53 and an irregular bottom edge 54 (as shown in FIG. 5), a cylindrical outer wall surface 51 and an inner cylindrical wall surface 52 with a stem chamber 49 therein.

The leg portion 79 comprises a right leg 55, a left leg 56, with right and left as shown in FIG. 5, and a front mouth 57 and a rear mouth 58. Mouth 57 is located to the front (as shown to the right in FIG. 4) between right leg 55 and left leg 56 and the rear mouth 58 is located to the rear, (i.e. to the left as shown in FIG. 4) between the leg 55 and the leg 56.

The mouth 57, as shown in FIG. 5, has a top edge 83, which is concave downward, and curved portions 84 and 85 to the left and right (left and right as shown in FIG. 5) respectively, which portions extend downwardly and outwardly from top edge 83 to a left front corner portion 86 and right front corner 87 respectively; rounded corners 86 and 87 outline and aid location of the bottom front edge of the legs 56 and 55 respectively. The bottom edge 88 of the left leg 56 is accordingly joined at the left front corner 86 via the upward and inwardly extending left mouth edge 84 to the top mouth edge 83 which in turn is continuous with the right rounded mouth edge 85 which extends downwardly and laterally to the right front corner 87 which is continuous with the bottom edge 89 of the right leg 55. After a. mechanical and thermal treatment of the pipe element 20 to provide the sput therein and thereby produce the intermediate shaped conduit unit 72 (and conduit portion 90 in completed assembly 100) and b. formation of the unit 50, as above described, the unit 50 is then thermally and mechanically treated (using the intermediate shaped unit, 72) to form the stem portion 80 of the T-assembly 100.

Prior to its location as shown in FIG. 4–6, the unit 50 which is about to be brought into contact with the sput portion 47 as shown in FIG. 4 has the leg portions thereof brought to temperatures above the transition temperature of the material used (PVC Type, Grade 1), but below fusion temperature thereof, by dipping for 30 seconds into a vat of glycerine at 300° F. This treatment is accomplished by holding the unit 50 vertically by supporting it from or near to its upper edge 53 and putting the lower edges of the leg portions into such vat and moving the unit 50 downward therein for immersion thereof to a point 99 (shown in FIG. 4), which point is at a height, measured from bottom edges 88 and 89 (shown in FIG. 5), about two inches higher than the point 83. Point 99 is the lowest point on the unit 50 which remains undistorted in the final position of the assembled portions 90 and 80. This gradual immersion of the leg portions and a small portion of the body of the unit 50 above the top of the mouths 57 and 58 raises the temperature of each such portion (prior to its contact with the conduit wall 22) above its transition temperature so that it will readily stretch; at the same time the temperature of these theretofore immersed portions of unit 50 is low enough to prevent any collapse and/or crinkling of the leg portions 55 and 56 and edges as they are moved downward in contact with portions 46, 70 and 22 of intermediate unit 72 when they embrace and form a firm match and mechanical fit with the conduit wall surface 22, sput portion 47, transition portion 70 and surface 22 and permits slight stretching thereof to form an exact close fit with such portions 47, 70 and 22.

The vinyl polymer used is Type I, grade 1 rigid PVC (polyvinyl chloride) as defined by ASTM D–1784 with following (Table IV) characteristics, Type II, PVC and ABS polymer may also be used.

The particular exemplary plastic material described (Type I, grade 1, PVC) is illustrative, not limiting, of formulations that form into a pipe with engineering and physical properties as in Table IV, or such others are well known (e.g. at *Source Book of New Plastics*, Simonds 1961, Vol. 2, Reinhold Pub. Co., Table 2, page 165; page 84 of *Modern Plastics*, May 1965, Table I, "Typical properties of plastic pipe materials") and the state of the art also permits of varying properties using the same polymer with variations in the content and composition of plasticizer, (e.g. "Formulating Plasticizer Blends by Master Charts," John McBroom, pages 145–146, January 1966, *Modern plastics*.)

To form the unit 50 into the stem portion 80, the unit 72 which becomes portion 90 is located in a jig 61 (as shown in FIG. 6) which jig 61 is provided with seats 62 and 63 conforming to bottom of wall surface 22 and joined by and to connecting pieces as 64 and held in position thereby: such pieces as 64 extend longitudinally of the shaped conduit and are fixed to seats 63 and 62.

After heating the leg portions 55 and 56 thereof as above described, and while such legs are at about 300° F., unit 50 is held with the central longitudinal axis 81 of chamber 49 vertical and in the center of circular hole 40 and intersecting the longitudinal axis 91. A collar 66 is then applied around the body portion 60 (shown in FIG. 4) of the unit 50. Collar 66 is a rigid hollow circular ring flat at its top and 2 inches deep at its front (and rear) as shown in FIGS. 4 and 6 and a maximum of 4 ½ inches deep at center of its left and right sides 102 and 103 (shown in FIG. 5). It is formed of steel and has a smooth interior surface, with a diameter adjustable by adjustment ears and screw 67 (shown in FIG. 5). The interior surface of collar 66 is lubricated by the hot glycerin on the outer surface of stem unit 50 and smoothly fits the exterior surface of the stem unit 50 and forms a smooth slidable fit therewith during this forming operation. At the same time the interior surfaces of the leg portions 55 and 56 and of the mouths 57 and 58 are also covered with a thin but substantially complete layer of glycerin from the vat that remains adherent thereto in the stages of the process shown in FIGS. 4 and 5; such glycerin layer forms a smooth lubricant contact with the exterior surface of sput 47, transition portion 70 and the top of surface 22 of the shaped conduit unit 72 as legs 55 and 56 move thereover.

A flat bottomed piston 65 (shown in FIG. 6) then presses the top end of 53 of stem unit 50 vertically downwards so that the front and top edges of mouths 57 and 58 of stem unit 50 contact the cooled and rigid surfaces of sput 47, portion 70 and the top of surface 22 are longitudinally stretched and spread apart as the legs 55 and 56 move downward over the cooled rigid outer wall surface 22 of the shaped conduit unit 72. Thereby the interior of such bottom surface of the shaped stem unit 73 (stem portion 80 in the T-assembly 100) exactly matches the exterior contour of the shaped conduit element 72 and is strengthened by concomitant stretching. The total time for such movement of edges 88 and 89 of stem unit 50 downward of 7 inches (i.e. 2 inches over the sput 47 and and slightly less than 5 inches vertically downward from the top of the curved outer wall surface 22) is from 3 to 6 seconds. The speed of downward movement of the piston 65 is controlled accordingly and the upper, body portion 60 of stem unit 50 above point 99 is sufficiently rigid to keep the downwardly moving stem unit 50 moving with its longitudinal axis 81 perpendicular to the axis 91 of the shaped conduit unit 72. The stretching of the stem unit wall material (between surfaces 51 and 52) located between the top and side portions of mouths 57 and 58 (such as the wall portions which are near to but sideways of edges 84 and 85 and which are upwards of edge 83) which has been warmed and lubricated as above described around and against sput 47 and transition portion 70 and top of surface 22 of shaped conduit unit 72 concomitant on the longitudinal (parallel axis 91) motion and spreading of the top and side edges of mouths 57, (to right in FIG. 6) and 58 (to left in FIG. 6) in contact with the rigid yet smooth outer surface of the sput portion 47 transition portion 70 and surface 22 not only provides a perfectly matching fit between such deformed stem unit wall material and portions 47, 70 and 22 of shaped conduit unit 72 but strengthens such stem unit wall material. Accordingly, only a loose sliding fit is required between the interior of collar 66 and the exterior of stem unit 50 while the legs 55 and 56 moves downwards (as shown in FIG. 5 and 6) over the shaped conduit unit 72. The stem unit 50 is formed on the shaped conduit unit 72 within 60 seconds of when stem unit 50 is withdrawn from the vat in which the legs were rendered plastic and the stem unit 50 is maintained in a vertical position generally as shown in FIGS. 4, 5 and 6 by the straight line motion of piston 65; the downward speed of movement of the stem unit 50 is sufficiently slow during the piston step shown in FIGS. 4, 5 and 6 that the edges 88 and 89 completely match surface 22 and do not crack, and expand longitudinally only very slightly although there is much longitudinal distortion of the edges (as 183, 184, 185, shown in FIG. 7) of the mouths 57 and 58. Shaped stem unit 73 (formed as above described from stem unit 50 by molding on shaped conduit unit 72) and shaped conduit unit 72 (formed as above described from pipe element 20 with the mandrel 33) are then firmly held together by tightening screw 67 of collar 66 in the orientation of parts achieved as above described and shown in FIG. 6 and, while so held together, completely immersed in a liquid bath of water at 50° to 80° F. Such immersion is effected within 60 seconds from the time that the leg portion of stem unit 50 had been withdrawn from its heating in the 300° F. liquid bath. This immersion in the cooling water lasts, preferably, from 3 to 5 minutes and the former leg portions and the portions near the mouths 57 and 58 of the former stem unit 50, thereby, lose their capacity for plastic distortion and become stable and rigid in their form of a substantially exact match with the adjacent surfaces of shaped conduit unit 72. After such cooling, collar 66 is released from attachment to shaped stem unit 73 and removed and the thus formed shaped stem unit separated from the shaped conduit unit 72 prior to and in preparation for the below described cementing operation for joining these two parts thus formed with similar matching surfaces.

All surfaces of the shaped stem unit 73 and of the shaped conduit unit 72 are then thoroughly cleansed of glycerin and cleansed in water and the portions of the surface of shaped conduit unit 72 and shaped stem unit 73 that had theretofore been in contact with each other as shown in FIG. 6 are coated with a primer to break the surface glaze and soften the surface. For this purpose the primer used is a solvent for the polyvinyl chloride which softens it, such as cyclohexanone, tetrahydrofuran, or methylethyl ketone; however tetrahydrofuran is preferred (and may have a trace of dioctylphthalate). Such softening of the surface that is to be cemented assures a better bond between the two separate pieces.

A standard formulation such as at Table III is used to bond the rigid polyvinyl chloride to itself, such formulation is brushed onto the previously softened surfaces.

TABLE III

| Parts by Weight | Material |
| --- | --- |
| 100 | polyvinyl chloride resin, medium molecular weight |
| 100 | tetrahydrofuran |
| 200 | methylethyl Ketone |
| 1.5 | tin organic stabilizer |
| 20 | dioctyphthalate |
| 25 | methyl isobutyl ketone |

After the glue-coated pieces have been placed in a jig as in FIG. 6, pressure is applied to the top, bottom, and side of the stem portion to further assure that a proper adherence is affected. The completed T-assembly 100 is left in this jig from two to four hours and, at the conclusion of such period, the T-assembly 100 is removed from the jig.

In the finished T-assembly 100 which is shown in FIGS. 7 and 8 the stem portion 80 is provided with an expanded connector portion or bell 82 and the conduit portion 90 is provided with expanded bell portions 92 and 93 at either end of central portion 97. In T-assembly 100, the stem portion 80 comprises a flange portion 159 and a cylindrical body portion 160 firmly joined to each other. The flange portion 159 is firmly joined to the outer wall surface 22 of the conduit portion 90. The body portion 160 is a vertical, cylindrical portion with the somewhat larger bell 82 at the one end (or top) and a portion 150 (shown in FIG. 8) at the other end (therebelow).

The portion 150 is the same diameter as the portion forming the body portion 60 in the stem unit 50 from which this stem portion 80 is formed.

The flange portion 159 comprises a front lip portion 157, a rear lip portion 158, a left lip portion 156 (shown in FIG. 10) and a right lip portion 155 (shown in FIG. 9). These are firmly attached to each other. All portions of the bottoms of these flange portions are flush with and are firmly attached to the surface 22 and the sput portion 47 of the shaped conduit unit 72. The interior wall of the body portion 160 of the stem portion 80 is firmly adherent and cemented to the outer wall of the sput portion 47 of the conduit portion 90. This sput portion extends a few inches upward from the remainder of the cylindrical outer wall surface 22 of the conduit portion 90 and the sput portion is formed with a smoothly curved transition zone or portion 70 from the wall portion 22 to the opening 40 at the top of the sput portion 47 and work hardened parallel to axis 81.

The bottom edge 188 of the flange portion 156 (and 155) extends down to a level which is slightly above the central longitudinal axis 91 of the conduit portion 90.

The assembly 100 is an extremely sturdy structure not only due to the firm adhesive connection of the stem portion 80 to the conduit portion 90 but also, because of the mechanical cooperation between these two elements available: a strong mechanical connection of the stem portion 80 relative to conduit portion 90 is provided by the sturdy structure of the sput 47 which projects into the stem portion 80 and mechanically locks it against motion parallel to axis 91 as well as having the adhesive connection therewith that is resistant to tensile stress along the direction of the vertical axis 81.

The stem portion 80 so located on the conduit portion 90 is firmly attached thereto, not only because of the adherent attachment of the outer surface 22 of the conduit and the transition portion 70 and sput 47 to the flange lips portions 155, 156, 157, 158 by the zone of adhesive that completely fills the space therebetween and is firmly adherent to lock such surfaces but also because the sput 47 projects sufficiently upward to firmly engage and mechanically prevent any movement of the flange lip portions 155, 156, 157 and 158 in a direction parallel to the longitudinal axis 91 of conduit portion 90 which axis is also the longitudinal axis of the shaped conduit unit 72 as well as the longitudinal axis of the pipe element 20 from which the shaped conduit unit 72 is formed and in a direction transverse to both the vertical axis 81 of stem portion 80 and the longitudinal axis 91, and because the material of the transition and sput portion of conduit portion 90 is strengthened (by stretching) parallel to vertical axis 81 while the flange portion 159 of the stem portion is strengthened parallel to the longitudinal axis 91 and portions 80 and 90 are firmly joined by cementing to each other.

This structure permits not only some bending but also a resiliency that avoid any potentially harmful development of cracks at high stress points. As illustrated in FIG. 9, the bottom portion 122 of the wall 123 of the conduit portion 90 may be deformed because of water hammer effects in an irrigation system as 110 (shown in FIG. 12).

An irrigation system 110 is generally shown in FIG. 12 wherein a main line 105 is continuous with the longitudinal axis 91 of the conduit portion 90 of the T-assembly 100 while a branch line 106 is coaxial with the axis 81 of the stem portion 80 and sprinklers 107 sprinkling sprays of water 108 to a field 109 are supplied such branch lines 106. In such a situation, therefore, a water hammer effect as might otherwise provide too rapid a shock to the wall 122 on the opposite of the T-assembly 100 to which the branch line 106 is attached is withstood and contained by the structure of T-assembly 100 that permits such use without affecting the attachment of the flange portion 159 to the conduit portion 90 and also distribute such stress over the full length (from bell 92 to bell 93) of the central portion 97.

FIG. 10 shows the action of the wall structure in the T-assembly 100 because of the permitted flexing of the lower wall portion 122 of the central portion 97 when there is axial movement of the T-assembly 100 relative to the branch line 106 and an angular relation other than a right angle between the axis 81 of the stem portion 80 and the axis 91 of the conduit portion 90 because the wall portion 122 of the central portion 97 can accommodate such distortion without damage notwithstanding there is stress on the flange portion 159 of the stem portion 80 in such situation.

Figure 13:
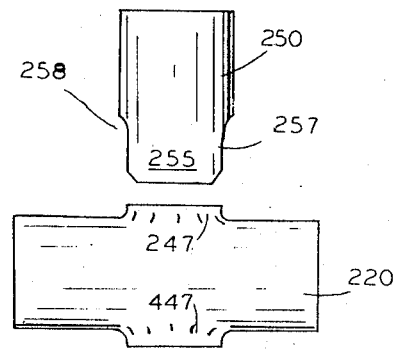
FIG. 13 is a side and expanded view of components used in manufacture of a cross 300 according to this invention.
Figure 14:
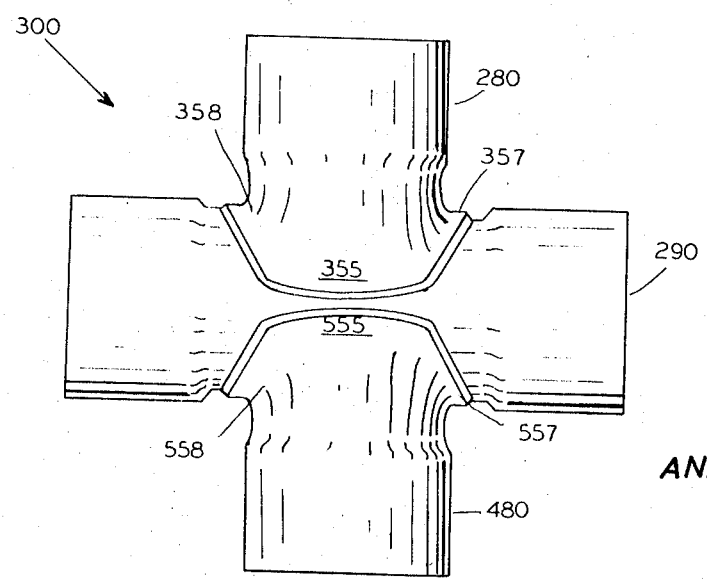
FIG. 14 is a side view of a cross 300 according to this invention.

The above described procedure is also used to form a cross 300 as shown in FIGS. 13 and 14. In this procedure a unit 250 (corresponding to stem unit 50), provided with a rear mouth 258, front mouth 257 (corresponding to mouth 57 and 58 of stem unit 50) and also with a right leg 255 and left leg (not shown), is joined to a conduit unit 220 (corresponding to the above described shaped conduit unit 72) with a sput 247 (corresponding to the sput 47 hereinabove described) and a unit 450 (corresponding to the stem unit 50) (shown in FIG. 13) and having a rear mouth 458 and a front mouth 457 and a left leg portion 455 (corresponding, respectively to the mouths 58 and 57 and leg 55 of the stem unit 50) are formed on the portion of conduit unit 220 which is provided with a sput 447 (corresponding to 47). The sputs 247 and 447 are formed as above described for the sput 47 and the flange portions 355, 356 (not shown), 357 and 358 are developed in the same manner on units 250 and 450 as described for flange lips 155–158 on the unit 50 (the flange portion 555, 557, 558 on the unit 480 is similarly developed on the unit 450 in the same manner as above described for the stem unit 50). Thereafter the units 280 and 480 are joined to the conduit unit 220 as above described for the joining of the shaped stem unit 73 to the shaped conduit unit 72 following the application of cement as above described for T-assembly 100 to the matching surfaces formed by the units 250 and 450 on the conduit unit 220. This provides a cross, the structural characteristics of which are as above described for the T-assembly 100.

Legs 55 and 56 (shown in FIG. 5) are of the same size and shape and mouths 57 and 58 (shown in FIG. 4) are of the same size and shape. Leg 55 (like 56, 256 (not shown), 255, 455 and 456 (not shown)) is mirror symmetrical about plane 8B-8B and mouth 57 (like 58, 257, 258, 457 and 458 (shown in FIG. 13)) is mirror symmetrical about plane 7B—7B. The sput portion 47 projects 2 inches for a 10 inch o.d. thermoplastic pipe and, in other sizes, from 4 to 12 inch o.d., one-fifth of the pipe diameter or 1 inch, whichever is greater, so that the collar 66 may firmly clamp the shaped stem portion 73 to such sput during quenching for wall thickness in range of one-eighth to one-half inch, the transition portion 70 of the shaped conduit unit 72 has a minimum curvature (at top of wall 22 as shown in FIG. 4) of one-fourth inch or the full wall thickness, whichever is greater, for a smooth curvature for stretching of the sput, as 47, and for stretching and shaping therewith the shaped stem unit as 73. Other curvatures for different size conduits at the transition zone thereof are set out in Table I.

TABLE IV.—PROPERTIES OF PLASTIC PIPE MATERIAL USED

| | ASTM test | Temp., °F. | PVC I | PVC II | ABS I | ABS II |
|---|---|---|---|---|---|---|
| Mechanical properties: | | | | | | |
| Tensile strength, 1,000 p.s.i | D638 | 73.4 | 7 | 6 | 5.1 | 8 |
| Tensile modulus, p.s.i | D638 | 73.4 | 410 | 320 | 230 | 350 |
| Compressive strength, p.s.i | D695 | 73.4 | 9.6 | 8.3 | 6.4 | 10 |
| Flexural strength, p.s.i | D790 | 73.4 | 14 | 11 | 7.8 | 12 |
| Impact strength— | | | | | | |
| (Ft.-lb./in. of notch) | D256 | 73.4 | 1.0 | 14 | 8.5 | 4.5 |
| (Ft.-lb./in. of notch) | D758 | 32 | 0.45 | 1.5 | 2.2 | 1.8 |
| (Ft.-lb./in. of notch) | D758 | −40 | 0.3 | 0.5 | 2.5 | 0.7 |

TABLE IV.—Continued PROPERTIES OF PLASTIC PIPE MATERIAL USED

| | ASTM test | Temp., °F. | PVC I | PVC II | ABS I | ABS II |
|---|---|---|---|---|---|---|
| Thermal properties: | | | | | | |
| Specific gravity | D792 | | 1.38 | 1.35 | 1.04 | 1.06 |
| Water absorption, percent increase in weight. | D570 | 73.4 | 0.07 | 0.07 | 0.25 | 0.25 |
| Expansion coefficient (linear 10 in./in.° F. | D696 | | 2.9 | 5.5 | 5.6 | 4 |
| Deflection temperature (heat distortion) 264 p.s.i. | D648 | | 160 | 155 | 196 | 215 |
| 66 p.s.i. ° F | D648 | | 165 | 160 | 208 | 227 |
| Flammability, in./min | D635 | | S.E." | S.E." | 1.3 | 1.3 |

NOTE:
SE = self extinguishing
a = normal impact
b = high impact

We claim:
1. A process of forming a plastic conduit connector comprising the steps of
   a. forming a longitudinally elongated hole in a cylindrical pipe, heating the zone of wall material around said hole, drawing said heated zone outwardly while forming a sput of circular shape on said wall material and extending said sput at an angle to the axis of said conduit;
   b. forming a stem portion from a bifurcated tube, heating said bifurcated portion of said tube and moving said heated portion on to said conduit with said sput, and
   c. forming flanges on said bifurcated portion by contacting said bifurcated portions with the outer surface of said conduit and sput and stretching it thereon, then rapidly chilling said thus formed bifurcated conduit while in contact with and stretched over said conduit with sput;
   d. separating said stem portion and said conduit portion,
   e. applying cement to the surfaces of said stem and said conduit previously in contact and
   f. pressing said thus cemented surfaces against each other and thereby forming a bond between said cemented portions.

2. Process as in claim 1 wherein said sput is formed with the axis thereof at a right angle to the axis of said conduit and said sput portion is at right angles to said conduit and wherein said flanges from said bifurcated leg portions do not increase in length transverse to the axis of said original stem portion at their bottom edges.

3. Process as in claim 2 wherein the portion between a bottom edge and the top edge of the bifurcated leg portion are distorted and expanded in a direction parallel to the longitudinal axis of said conduit.

4. A process as in claim 1 comprising the steps of
   a. forming two longitudinally elongated holes in a cylindrical pipe, heating the zone of wall material around each said hole, drawing said heated zone outwardly while forming a sput of circular shape on said wall material and extending said sputs at an angle to the axis of said conduit;
   b. forming each of a plurality of stem portions from each of a plurality of bifurcated tubes heating said bifurcated tubes heating said bifurcated portions of said tubes and moving said heated portions on to said conduit with said sputs, and
   c. forming flanges on each said bifurcated portions by contacting said bifurcated portions with the outer surface of said conduit and sput and rapidly chilling said thus formed bifurcated conduit while in contact with said conduit with sput;
   d. separating said stem portions and said conduit portions,
   e. applying cement to the surfaces of said stems and said conduit previously in contact and
   f. pressing said thus cemented surfaces against each other and thereby forming a bond between said cemented portions.

5. Process as in claim 4 wherein said sputs are formed with the axis thereof at a right angle to the axis of said conduit and said sput portions are at right angles to said conduit and wherein said flanges from said bifurcated leg portions do not increase in length transverse to the axis of said original stem portion at their bottom edge.

6. Process as in claim 5 wherein the portion between said bottom edge and the top edge of the bifurcated portions are distorted and expanded in a direction parallel to the longitudinal axis of said conduit.

* * * * *

UNITED STATES PATENT OFFICE
CERTIFICATE OF CORRECTION

Patent No. 3,654,008          Dated April 4, 1972

Inventor(s) FRANK J. ROGERS and JOE MAC CLOSE

It is certified that error appears in the above-identified patent and that said Letters Patent are hereby corrected as shown below:

Cover sheet, column 1, item [54], "MANUFACTURE OF A PROCESS OF A PLASTIC T-ASSEMBLY" should be --- PROCESS OF MANUFACTURE OF A PLASTIC TEE ASSEMBLY ---;

Cover sheet, column 1, item [72], "Joe MacClose" should be --- Joe Mac Close ---;

Page 1 of Specification, column 1, line 1, "MANUFACTURE OF A PROCESS OF A PLASTIC T-ASSEMBLY" should be --- PROCESS OF MANUFACTURE OF A PLASTIC TEE ASSEMBLY ---.

Signed and sealed this 1st day of May 1973.

(SEAL)
Attest:

EDWARD M. FLETCHER, JR.      ROBERT GOTTSCHALK
Attesting Officer               Commissioner of Patents